Aug 5, 1941.　　　T. L. FAWICK　　　2,251,444
ASSEMBLY FOR DRIVING CLUTCHES AND THE LIKE
Filed March 18, 1937　　　3 Sheets-Sheet 1
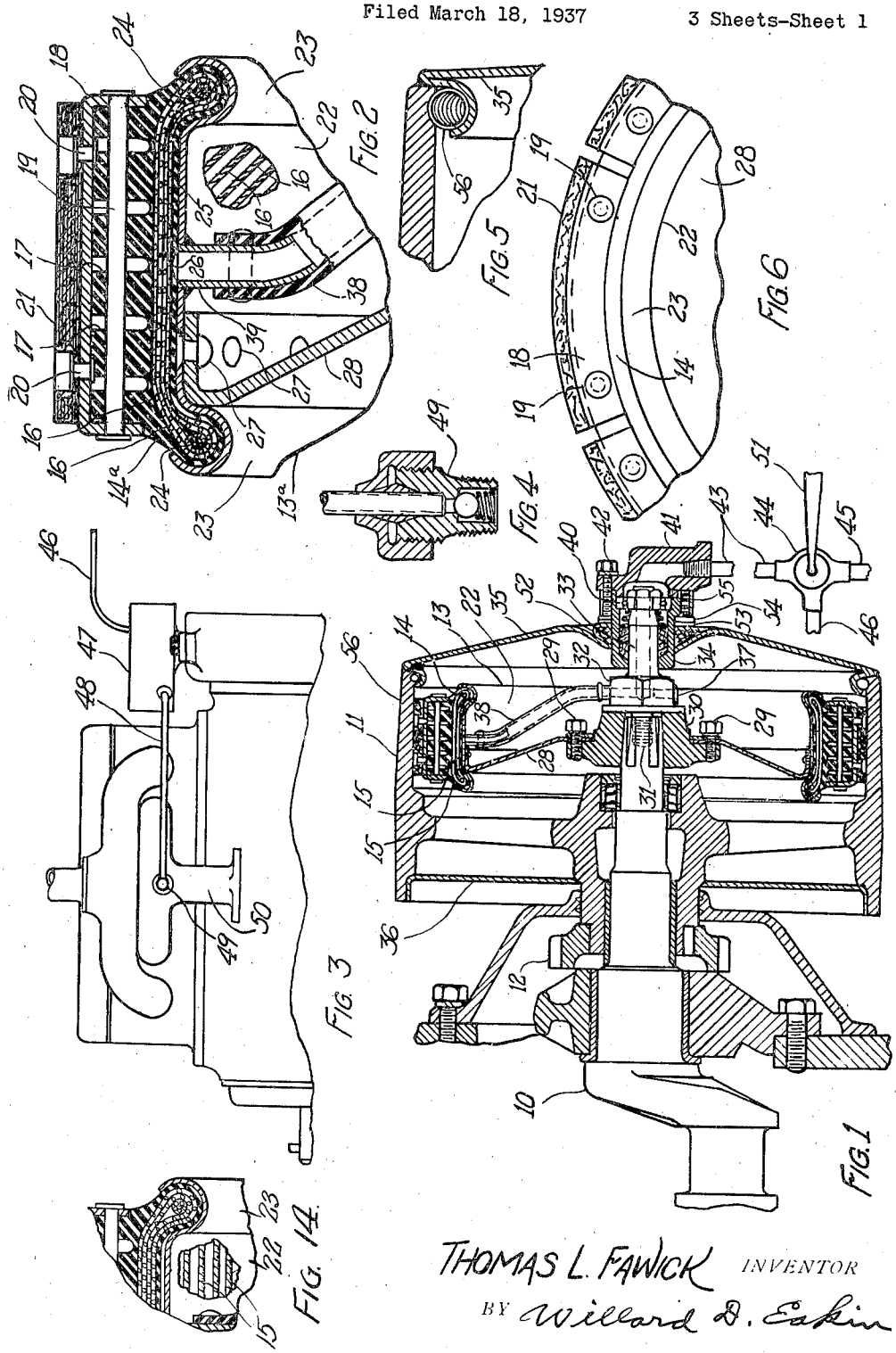
THOMAS L. FAWICK  INVENTOR
BY Willard D. Eakin
ATTORNEY

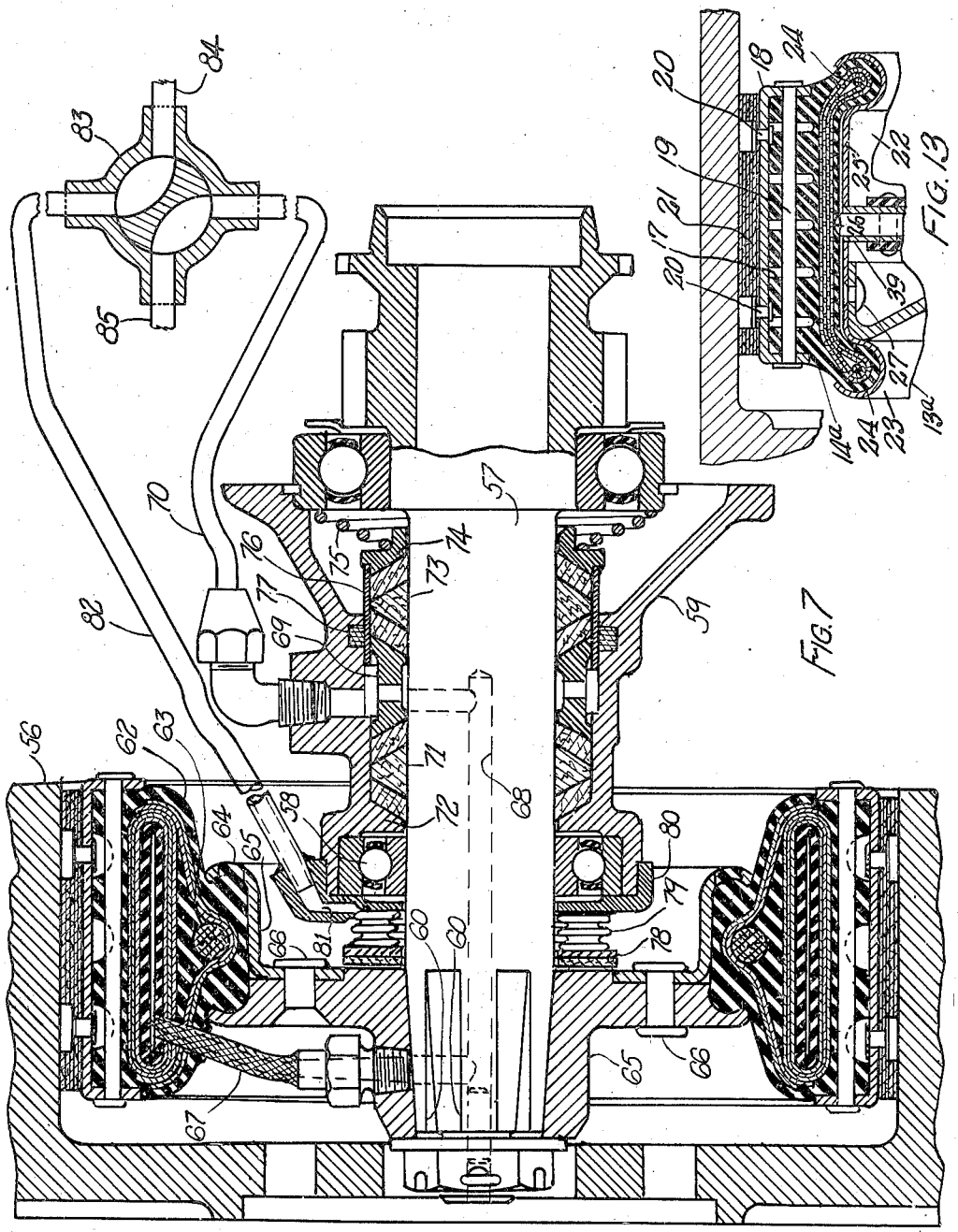

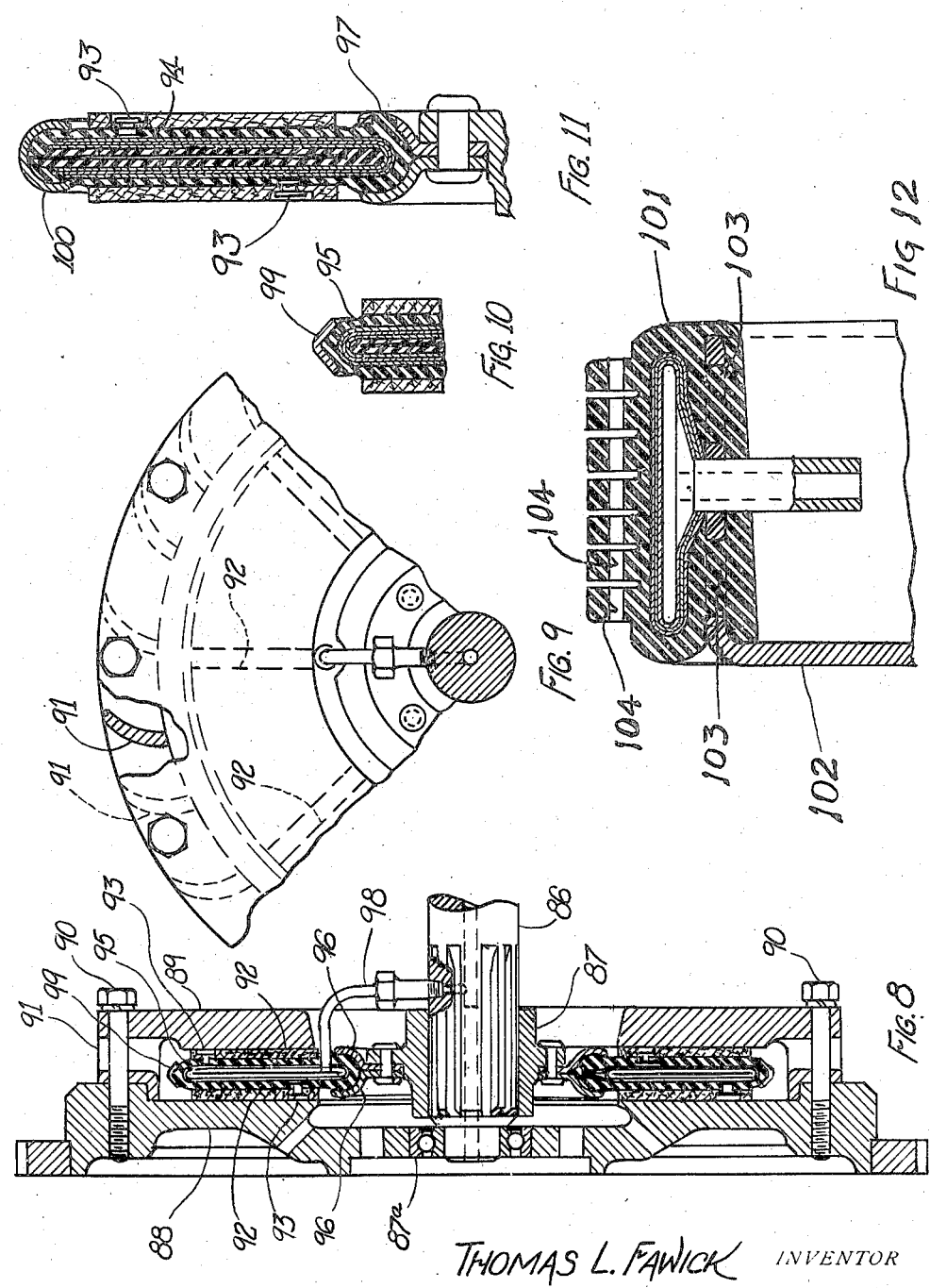

Patented Aug. 5, 1941

2,251,444

UNITED STATES PATENT OFFICE 2,251,444

ASSEMBLY FOR DRIVING CLUTCHES AND THE LIKE

Thomas L. Fawick, Akron, Ohio, assignor to The Fawick General Company, Inc., Akron, Ohio, a corporation of Indiana Application March 18, 1937, Serial No. 131,656

11 Claims. (Cl. 192—88)

This invention relates to assemblies suitable primarily for use as driving clutches, although some of its features are applicable also to flexible couplings and brakes, and to methods of making them.

Its chief objects are to provide an improved cushioning torque-transmitting means; to provide a pneumatic torque-transmitting member adapted for engagement and disengagement by the ingress and egress of a very small amount of air or other actuating fluid and thus, in the case of a clutch or a brake, to provide for quick engagement and disengagement; to provide for dependable complete disengagement although the range of engaging and disengaging movement is very short and although the centrifugal force is strong; to eliminate the need of a pilot bearing between the transmission shaft and the fly-wheel hub of an automobile; to provide torque transmitting means of great strength and at the same time adapted to cushion the action of the assembly; to provide improved torque-transmitting means adapted to compensate for shaft misalignment without undue resistance; to provide for effective dissipation of such frictional heat as may be generated; and to provide for lightness of parts, economy of construction and facility of replacement of parts.

This application discloses subject matter described and claimed in my United States Patents No. 2,111,422, granted March 15, 1938, and No. 2,141,645, granted December 27, 1938, and my copending applications Serial No. 365,489, filed November 13, 1940, and Serial No. 365,490, filed November 13, 1940.

Of the accompanying drawings:

Fig. 1 is a longitudinal section of an assembly embodying my invention in its preferred form as applied to a farm tractor of known construction, parts being broken away.

Fig. 2 is a transverse section of a pneumatic torque-transmitting member, suitable for substitution in the assembly shown in Fig. 1, and of adjacent parts of the assembly.

Fig. 3 is an elevation of parts of the motor of the tractor represented in Fig. 1, including provision for supplying suction for collapsing and thereby disengaging the pneumatic torque-transmitting member of Fig. 1 or of Fig. 2.

Fig. 4 is a longitudinal section of a check-valve which is a part of the structure of Fig. 3.

Fig. 5 is a fragmentary transverse section illustrating a preferred arrangement for detachably securing an end-closure plate to the fly-wheel of the tractor of Fig. 1.

Fig. 6 is a fragmentary side elevation of the pneumatic torque-transmitting member of Fig. 1 or of Fig. 2 and associated parts.

Fig. 7 is a longitudinal section of an assembly embodying my invention in a somewhat different form, as applied to an automobile motor and transmission of well known construction.

Fig. 8 is a longitudinal section of an assembly embodying my invention in still another form as applied to an automobile motor and transmission of well known construction.

Fig. 9 is a fragmentary elevation of parts shown in Fig. 8, as viewed from the right of that figure, a part being broken away to show internal structure.

Fig. 10 is a fragmentary section of parts shown in Fig. 8, on a larger scale.

Fig. 11 is a similar section illustrating a slightly different form of pneumatic torque-transmitting member and associated parts.

Fig. 12 is a sectional view of a modification.

Fig. 13 is a fragmentary transverse section corresponding to Fig. 2 except that it shows parts in their distended, clutch-engaged positions.

Fig. 14 is a fragmentary transverse section corresponding to Fig. 2 except that it shows reinforcing cords, 15, 15 extending directly crosswise of the distensible member, in planes parallel with the axis of rotation, instead of the obliquely disposed cords 16, 16 of Fig. 2.

Referring to the drawings, and at first to the embodiment illustrated in Figs. 1 to 6, 10 is the crankshaft of a farm tractor of known construction, having loose-journaled thereon a belt pulley 11 for use of the tractor as a stationary power unit, the belt pulley having secured upon its hub, within the motor and transmission housing, a gear 12 adapted for engagement and disengagement therewith of a gear (not shown) of the tractor-driving transmission.

The belt pulley 11 is formed with an internal drive surface adapted for frictional engagement and disengagement of a pneumatic clutch structure, which may be that shown at 13 in Fig. 1 or that designated 13ª in Fig. 2.

This pneumatic clutch structure comprises an annular rubber torque-transmitting member 14 (or 14ª in Fig. 2). As the structure shown in Fig. 2 differs from the corresponding parts shown in Fig. 1 only in that the rubber member 14 in Fig. 1 is reinforced with cords 15 (see Fig. 14) extending only in a directly transverse direction, for softness of torque-cushioning and for low resistance to shaft or drive-surface misalignment, whereas the rubber member 14ª of Fig. 2 is reinforced with obliquely disposed cords 16, 16, for strength in torque-transmission, and as the large scale of Fig. 2 makes the parts more clear, the description of the parts will proceed for the moment with reference to Fig. 2.

The rubber member 14ª has the general form of a very much flattened pneumatic tire casing, with a radially thick zone of tread rubber formed with narrow and deep longitudinal grooves 17, 17 for high cushioning action of the rubber and for strong frictional grip of the groove-defining ribs of rubber against a circumferential series of friction shoes mounted upon it.

Each of these shoes comprises an arcuate sheet-metal plate 18 of channel form in cross-section, which can be economically produced by rolling or by stamping, the tread portion of the rubber member being mold-vulcanized for the channeled plates to fit snugly thereon and also mold-vulcanized with transverse holes through the groove-defining ribs for the reception of pins or rivets such as the rivet 19 (see also Fig. 6) which extend also through holes in the side flanges of the metal plates, as is clearly shown.

Secured upon the outer face of each of the metal plates by rivets 20, 20 is an arcuate block of clutch-facing material 21, which may be of the usual composition comprising asbestos.

The friction shoes, each comprising the flanged metal plate 18 and the frictional block 21 thereon, are slightly spaced apart circumferentially of the assembly so that the circle represented by the arcuate outer faces of the blocks can be enlarged by the small amount necessary for movement of the blocks from their disengaged to their engaged positions without excessive creeping of the rubber within the metal plates.

To provide for distending the rubber member by fluid pressure to engage the clutch, the rubber member preferably is formed with bead portions inclined radially inward and adapted to be sealed to a metal rim member 22 by crimping of transversely arcuate side flanges 23, 23 formed on the rim member and providing annular seats for the bead portions of the rubber member. For economy and convenience the rim member 22 can be rolled approximately to shape, but with the channel-defining side flanges more widely gaped than in their final form, before it is brought into association with the other parts. The rubber member can be provided, for anchorage of the cord reinforcement, with bead cores 24, 24 having substantial elasticity, as by forming them of fibrous cables, and the rubber member, after being mold-vulcanized to shape, can be stretched into position on the rim member, after which the flanges of the rim member, as by rolling or by simple pressing, can be tightened upon the bead portions of the rubber member to provide the fluid seal.

In order that the rubber member may be distended by the induction of a very small amount of fluid between it and the rim member and retracted by the withdrawal of only a small amount of fluid from it, the two members preferably are formed to fit each other snugly, a rubber facing 25 permissibly being provided on the inner face of the reinforcement cords for that purpose, but at least a circumferential distributing channel, such as the channel 26, of small volume, preferably is formed in the inner face of the distensible member, especially when it is rubber-surfaced for smooth fitting against the rim member.

The rim member 22 is secured by rivets 27, 27 upon a dished wheel-body member 28, which can be a metal stamping, and this is mounted, by means of screws 29, 29, upon a hub member 30 which is taper-splined upon the end of the crank-shaft 10 of the motor.

For holding the hub member 30 upon the splined end of the crank-shaft and also for conveniently providing for conduction of pressure fluid to distend the rubber member away from the rim member 22, a screw 31 is threaded into the end of the crank-shaft and is formed with a fluid-conducting head 32 and an axial extension 33, the latter being journaled in a stationary packing gland 34 on which is mounted for rotation an end closure plate 35 for the belt pulley 11, which has also a pressed-in closure plate 36 at its other end and thus provides a complete protective enclosure for the major parts of the clutch assembly.

The head 32 and axial extension 33 of the screw 31 are formed with a fluid-conducting channel leading from the outer end face of the extension to a side face of the head, as by forming the screw member with the two intersecting bores as shown and then inserting a closure plug 37, and this channel is connected, by a preferably flexible hose 38, with a metal conduit stem 39 having its outer end mounted in an aperture in the rim member 22, in communication with the distributing channel 26 of the distensible member, and the stem 39 is welded to the rim member to seal it thereto.

A ball bearing 40 can be mounted between the extension 33 and the wall of its packing gland 34 and held in place by a fluid coupling member 41 secured by screws such as the screw 42 to the gland, the interior of the coupling member 41 being in communication with the conduit formed in the screw member and also in communication, through a pipe 43, with a three-way valve 44 of which the other two connections, 45, 46, lead respectively from any suitable source of pressure fluid (not shown) and from a vacuum tank 47 (Fig. 3) mounted preferably close to the clutch mechanism and permissibly on the motor as shown, the vacuum tank 47 having communication, through a pipe 48 and a check-valve 49, with the intake manifold 50 of the motor.

The actuating lever of the three-way valve 44, shown at 51 in Fig. 1, can have any suitable connection to an operating mechanism or can be moved by hand.

For rotatably sealing the inner margin of the closure plate 35 to the outer face of the gland 34 a ring 52 of packing material is mounted between the said margin and the nearest of a pair of relatively rotatable washers 53, 54 which are urged against the packing ring by a series of compression springs, such as the spring 55, set in sockets formed in a shoulder portion of the gland.

For facility of mounting and dismounting the closure plate 35, which conveniently can be formed of stamped metal, it is formed at its outer margin with an outwardly open channel adapted to seat a snap-ring, here shown as an annular helical spring 56, which is adapted also to engage in a groove formed in the inner face of the belt pulley 11.

In the operation of the device, the three-way valve 44 being set to conduct pressure fluid through the hose 38 into the space between the rim member 22 and the distensible member 14 (or 14ª) thereon, the latter is quickly distended, without such delay as would be incident to the flow of a large volume of air, and the friction blocks 21 are thus quickly brought into firm clutching engagement with the inner face of the belt pulley, without such development of frictional heat as would occur in the case of slow engagement, and yet without such suddenness as to constitute grabbing, especially as the cord-reinforced rubber member, through which all of the torque is transmitted in the embodiment here shown, desirably cushions the transmission of the torque.

For disengagement of the clutch the three-way valve 44 is reversed, to apply suction to the space defined by the distensible member and its metal rim, and this not only permits the distensible member to retract under the force of its own elasticity but also causes atmospheric pressure on its exterior to assist in its quick collapse, assuring that the clutch will be disengaged with very little sliding friction and with complete withdrawal of the friction shoes from contact with the belt pulley.

Also, the asbestos blocks on the shoes constituting a barrier to the flow of frictional heat from its place of generation to the rubber member, and the belt pulley being of such mass as to have a high heat-absorbing capacity, high temperatures are avoided and the parts are prevented from being deteriorated by heat.

When the proportions are as shown in Fig. 2 the chamber that is created by forcing fluid between the metal rim member 22 and the distensible, torque-transmitting and cushioning tire-like member 14 is of U or channel shape in cross-section, the rim member extending into the bay that is defined by the member 14, and this provides, in conjunction with the advantages of a small-volume chamber, the advantage that, when the member 14 has been forced out of contact with the metal rim member 22 to such transverse extent that the chamber has become U-shaped, and the clutch has thus been engaged, the middle zones of the members 22 and 24 can have free relative transverse movement, being out of contact with each other, as in the weaving movement that is incident to angular shaft misalignment, the side zones of the member 14, defining the legs of the U, having a hinging movement about the bead cores, so that the desirable flexible-coupling effect and the desirable small-volume effect are obtained in the same device.

In the assembly in Fig. 7, 56 is the fly wheel of an automobile motor and 57 is the drive shaft of the transmission, of which the parts driven by the shaft 57 can be of standard construction.

A bearing 58 is interposed between the shaft 57 and a bearing seat formed in the end bracket 59 of the transmission case and, by reason of the interposition of the flexible torque-transmitting device, with its flexible-coupling characteristics, between the shaft 57 and the fly wheel, the usual pilot bearing between the front end of the shaft and the fly wheel hub can be omitted, with the advantages of eliminating imperfect bearing operation and elimination of the transmission of vibration through such a bearing.

This construction also permits the use of taper splines 60, 60 on the forward end of the shaft 57, with secure and rigid mounting of the clutch-hub 61 thereon, and with avoidance of the weakness and wear that are incident to the use of a slidably splined clutch hub.

In this embodiment the distensible member, 62, is of a construction and mode of operation similar to those of the distensible member of Figs. 1, 2 and 6 as above described except that in this instance it is in the form of an annular bag having a single bead core 63 in its base portion, which portion can be inextensible and in fact is preferably formed of relatively hard rubber and with dowel projections, such as that shown at 64, adapted to fit in holes formed in a clamping ring 65 which is secured to the hub member 65 of the clutch by rivets 66, 66 to anchor the distensible member thereon.

In this embodiment the very thin cavity within the bag can be formed by building the rubber structure about a flat ring of waxed paper or the like, which can be left within the bag after the latter is mold-vulcanized.

In this embodiment provision is made for conducting pressure fluid to and from the bag through a flexible tube 67 and a channel 68 formed in the shaft 57 by slidably mounting in the bracket 59 a distributor ring 69 shaped to be in communication with the channel 68 of the shaft and with a connecting pipe 70 while at any of a substantial range of positions lengthwise of the shaft.

A packing 71 is mounted between a tapered side face of the distributor ring 69 and a tapered internal flange 72 of the bracket 59 adjacent the bearing 58 and a packing 73 is mounted between the tapered opposite face of the distributor ring and a tapered pack ring 74 slidably mounted on the shaft and urged against the adjacent packing by an axial-thrust spring 75 seated against the outer race of an adjacent shaft bearing.

The packing 71 is confined on its outer face by the inner face of a part of the bracket 59 and the packing 73 is confined on its outer face by a sleeve 76 seated against a shoulder formed on the pack ring 74, the sleeve being slidably fitted between one margin of the distributor ring and a cylindrical inner face of the bracket 59. The packing 71 is adapted to seal against the escape or ingress of fluid past its outer face as well as its inner face; the packing 73 is adapted to seal against the escape or ingress of fluid past its inner face and also to seal against the escape or ingress of fluid between it and the sleeve 76, and a sealing ring 77 is set in a groove in the inner face of the bracket 59 to prevent escape or ingress of fluid between that face and the outer face of the sleeve 76.

Means is provided for braking the clutch upon its disengagement, this means comprising an annular brake 78 surrounding the shaft 57 and adapted to act against the rearwardly facing surface of the clutch hub member 65. For its actuation the brake 78 is secured to the end of an annular bellows-like member 79 having circumferentially corrugated thin metal inner and outer walls surrounding the shaft 57 and defining an annular chamber, its other end being secured to a bearing-retainer 80 which is secured to the end of the bracket 59 and formed with a channel 81 through which the interior of the bellows-like member is in communication with a connecting pipe 82.

The pipe 82 to the distensible clutch-engaging bag and the pipe 70 to the bellows-like brake-actuating member lead from opposite sides of a four-way valve 83, the other two opposite sides of which have connection, through pipes 84 and 85 respectively, with a source of pressure fluid and a source of suction, so that alternatively presure fluid can be applied to the bag to engage the clutch and hold it engaged, while suction is concurrently applied to the bellows-like member to assist its own resilience in holding the clutch brake fully disengaged, or suction can be applied to the bag to assist the resilience of the bag in quickly disengaging the clutch and holding it disengaged while pressure fluid is concurrently applied to the bellows-like member to apply the brake and to hold it in braking position.

In this embodiment the cord reinforcements of the bag, for low resistance to shaft displacement, can be disposed in directly transverse positions as shown or, for greater strength of the bag in the transmission of the torque, they can have the oblique arrangement shown in Fig. 2.

In the embodiment shown in Figs. 8 to 11, the invention is applied to an assembly in which the clutch engaging faces are radially or transversely disposed with relation to the axis of rotation.

In this embodiment the transmission shaft 86 has the clutch hub member 87 straight-splined upon it, although this is not an essential.

A pilot bearing 87a also is shown between the transmission shaft and the hub of the motor fly-wheel 88, although it also is not indispensable.

A metal ring 89, formed with an annular clutch engaging face providing a mate for a similar face formed on the fly-wheel, is secured to the fly-wheel 88 by screw bolts 90, 90 and this ring as shown in the present embodiment is formed also with through passages through an off-set peripheral portion, these passages being defined by outwardly curved webs or bridge pieces 91, 91 which can be integral with the rest of the ring as shown, to provide a centrifugal fan effect for drawing air and worn particles from the frictionally engaging faces of the assembly and discharging them at the outer periphery of the fly-wheel, for carrying away such frictional heat as may be developed and for keeping the friction faces and the bearing clean.

The arcuate clutch-facing plates, 92, 92, those of the two sets preferably being in staggered relation, are secured by rivets 93, 93, of which the bases are vulcanized in the opposite walls of an annular disc-like rubber bag 95, which can have either radial or oblique cord reinforcement, the inner peripheral portion of the bag, as an anchoring portion, preferably being formed of relatively hard rubber and being gripped between annular clamping plates 96, 96 mounted upon the clutch hub member, and preferably interlocked with at least one of them by means of dowels such as the dowel 97 (Fig. 11) formed on the hard rubber base portion of the bag.

The bag is mold-vulcanized to a flat shape, with an extremely thin air chamber within it, as by building it about a ring of waxed paper, which can be left within it.

A flexible pipe 98 leads into the bag from a conduit formed in the transmission shaft, for alternatively applying fluid pressure and suction to the interior of the bag.

Preferably the bag has a ring of sheet metal 99 crimped upon its outer periphery, to sustain centrifugal force and prevent undesirable deformation of the bag under that force or under the force of internal fluid pressure.

The operation of this embodiment is substantially the same as that of the other embodiments as above described except that in this embodiment the bag of course effects drive engagement upon two of its sides in being distended and the engaging faces are so disposed as to be effectively cooled by the fan action of the webs 91, and the torque is transmitted from the clutch facings to the clutch hub through an axially flat annular zone of the bag which is adapted to transmit the torque somewhat in the manner of a fabric universal-joint disc.

In the bag assembly shown in Fig. 11 the construction is substantially the same as in Figs. 8 and 10 except that the body of the bag, containing the cord reinforcements, is mold-vulcanized upon a thin annular metal plate, from which it is then stripped or "unbuttoned," so to speak, after cutting through its wall to the edge face of the plate in case of complete enclosure of the plate by the bag material, after which it is sealed at its outer margin, with or without an application of rubber cement, by crimping thereon a ring of sheet metal 100, this type of bag being adapted to be built economically by any one of several methods already known to those skilled in the rubber art.

In this embodiment of Figs. 8 to 11, as in the others, such frictional heat as is developed is generated only at the surface of a metal member which is of high heat capacity and consequently is adapted to conduct the heat away effectively.

In all of the embodiments the application of suction to the distensible member is desirable for assuring quick and complete disengagement of the frictionally-engaging members, but this is especially true of assemblies in which the engaging end disengaging movement is that of a rotating part and is in a direction transverse to the axis of rotation, as in Figs. 1, 2, 6 and 7, because in that case centrifugal force of the rotating part may be so great as to prevent it from disengaging upon the mere venting of the pressure fluid, especially when the rotating part is heavy and its speed is high.

In such a case the valved connection to a source of strong suction, providing a suction representing a substantial fraction of an atmosphere, may be essential.

In the embodiment shown in Fig. 12 a bag 101 of modified form at its base is mold-vulcanized upon an apertured cylindrical portion of a bell-shaped metal member 102, the rubber of the base of the bag riveting through the apertures of the metal member as indicated at 103, 103, and the tread portion of the bag can be formed, the same as in Fig. 2, with holes 104, 104 for reception of rivets such as the rivet 19 of Fig. 2.

The inner face of the rubber preferably is molded with a bevel or taper, as shown, to facilitate separation from the molding means.

I claim:

1. An assembly comprising a member having an engagement surface, and, mounted for rotation in relation thereto, a fluid-distensible torque-transmitting and cushioning rotary structure adapted to engage said surface upon being distended in a direction radially outward from the axis of rotation, means for conducting pressure fluid to said structure to distend it, and means for applying suction to said structure to retract it against centrifugal force, the distensible srtucture comprising a torque-transmitting wall having substantially the characteritsics of rubber.

2. An assembly comprising a member having an engagement surface, a fluid-distensible, outwardly-expanding torque-transmitting and cushioning rotary structure adapted to engage said surface upon being distended, means for conducting pressure fluid to said structure to distend it, and power-actuated evacuating means for applying suction to said structure to retract it against centrifugal force.

3. An assembly comprising a member having an engagement surface, and, mounted for rotation in relation thereto, a fluid-distensible, torque-transmitting and cushioning rotary structure adapted to engage said surface upon being distended in a direction radially outward from the axis of rotation, means for conducting pressure fluid to said structure to distend it, and means including a vacuum-accumulator chamber for applying suction to said structure to retract it against centrifugal force.

4. An assembly comprising a member having an engagement surface, and, mounted for rotation in relation thereto, a fluid-distensible torque-transmitting and cushioning rotary structure adapted to engage said structure upon being distended in a direction radially outward from the axis of rotation, said structure comprising a metal member, a diaphragm member sealed thereto to define a chamber, and means for injecting a pressure fluid between the metal member and the diaphragm member and for withdrawing the pressure fluid by suction against centrifugal force.

5. An assembly comprising a member having an inwardly facing engagement surface, and, mounted for rotation in relation thereto, a fluid-distensible structure adapted to engage said surface upon being distended, said structure comprising oppositely bulged, torque-sustaining and cushioning, flexible side-walls which are unconfined and freely flexing in service, means for conducting pressure fluid to said structure to distend it, and a closure plate for the first said member.

6. An assembly comprising a member having an inwardly facing engagement surface, and, mounted for rotation in relation thereto, a fluid distensible structure adapted to engage said surface upon being distended, said structure comprising oppositely bulged, torque-sustaining and cushioning side-walls which are unconfined and freely-flexing in service for compensation of shaft misalignment, means for conducting pressure fluid to said structure to distend it, and a closure plate for the first said member, said fluid conducting means extending through said closure plate and being adapted for relative rotation of the plate.

7. An assembly comprising a motor crankshaft, a fluid-distensible, frictionally engaging clutch structure secured thereon, and means for conducting fluid to said clutch structure to distend it, said means comprising a member secured to the end of the crank-shaft and formed with a fluid passage, and shaped as a cap-screw to secure the clutch structure upon the crank-shaft.

8. An assembly comprising a member having an engagement surface, and, mounted for rotation in relation thereto, a fluid-distensible structure adapted to engage said surface upon being distended in a direction radially outward from the axis of rotation, means for conducting pressure fluid to said structure to distend it, and means for venting said structure to retract it, the fluid-distensible structure comprising a torque-transmitting wall having substantially the characteristics of rubber, and the fluid-distensible structure having for its distension a wide and thin fluid chamber of substantially no volume when the structure is in its retracted condition.

9. In a clutch assembly of the character described, a fluid-distensible rotary structure comprising a metal member having an annular surface, and an annular, cord-reinforced rubber diaphragm member sealed to said metal member throughout annular zones to define a chamber of which said annular surface of the metal member constitutes a wall, the diaphragm member lying substantially against the metal member substantially throughout the extent of the chamber when it is not distended, the metal member being of bendable sheet-metal and the diaphragm member being sealed to it by clamping pressure of a crimped portion of the metal, and a rotary structure adapted to be engaged by said fluid-distensible structure in driving relation.

10. An assembly comprising a member having an engagement surface and, mounted for rotation in relation thereto, a fluid-distensible structure adapted to engage said surface upon being distended, means for conducting pressure fluid to said structure to distend it, and means for venting said structure to retract it, the fluid-distensible structure comprising a wall having substantially the characteristics of rubber, and the fluid distensible structure having for its distension a wide and thin fluid chamber that is of U-shape in cross-section.

11. An assembly comprising a member having an engagement surface and, mounted for rotation in relation thereto, a fluid-distensible structure adapted to engage said surface upon being distended, means for conducting pressure fluid to said structure to distend it, and means for venting said structure to retract it, the fluid-distensible structure comprising a wall having substantially the characteristics of rubber, the fluid-distensible structure having for its distension a wide and thin fluid chamber that is of U-shape in cross-section, and the said wall being torque-transmitting and unconfined and freely-flexing in service.

THOMAS L. FAWICK.